US009325163B2

(12) United States Patent
 Pelletier (10) Patent No.: US 9,325,163 B2
(45) Date of Patent: Apr. 26, 2016

(54) CABLE RESTRAIN DEVICE WITH DUAL-MATERIAL DOUBLE WEDGE CHUCK

(71) Applicant: Thomas & Betts International, LLC, Wilmington, DE (US)

(72) Inventor: Jean-Michel Pelletier, Quebec (CA)

(73) Assignee: Thomas & Betts International, LLC, Wilmington, DE (US)

( * ) Notice: Subject to any disclaimer, the term of this patent is extended or adjusted under 35 U.S.C. 154(b) by 74 days.

(21) Appl. No.: 14/217,720

(22) Filed: Mar. 18, 2014

(65) Prior Publication Data

US 2014/0202761 A1 Jul. 24, 2014

Related U.S. Application Data

(63) Continuation-in-part of application No. 14/151,994, filed on Jan. 10, 2014.

(60) Provisional application No. 61/755,669, filed on Jan. 23, 2013.

(51) Int. Cl.
*H02G 3/18* (2006.01)
*H01R 13/58* (2006.01)
(Continued)

(52) U.S. Cl.
CPC ............ *H02G 15/007* (2013.01); *H02G 3/0658* (2013.01); *H02G 3/0675* (2013.01); *H02G 15/04* (2013.01); *Y10T 279/17358* (2015.01)

(58) Field of Classification Search
CPC ...... H01R 13/59; H01R 4/646; H01R 9/0527; H01R 13/187; H01R 13/5025; H01R 13/6584; H02G 3/0641; H02G 3/065; H02G 3/0658; H02G 3/0666
USPC .................... 174/653, 658, 652; 439/462, 98; 277/325
See application file for complete search history.

(56) References Cited

U.S. PATENT DOCUMENTS 3,744,008 A   7/1973  Castellani
3,913,956 A   10/1975 Eidelberg et al.
(Continued)

FOREIGN PATENT DOCUMENTS

CA    2247705 C    3/2006
CA    2536594 C    10/2011
(Continued)

OTHER PUBLICATIONS

"TCF050-27SS6." Thomas & Betts. Mar. 18, 2014. http://www.tnb.ca/en/web-catalogue/?co=CA&lang=en&a=nav&N=&Ntt=tcf.
(Continued)

*Primary Examiner* — Chau N Nguyen
*Assistant Examiner* — Roshn Varghese
(74) *Attorney, Agent, or Firm* — Snyder, Clark, Lesch & Chung, LLP (57) ABSTRACT

A chuck for a cable fitting includes multiple segments substantially forming a ring shape. Each segment of the multiple segments includes a first tapered surface on a distal end, wherein the first tapered surface slopes from the distal end away from a central axis of the ring, and a second tapered surface on a proximal end, wherein the second tapered surface slopes from the proximal end away from the central axis. The chuck also includes a flexible band to hold the multiple segments in the ring shape. Each segment of the multiple segments is configured to receive compressive forces on the first tapered surface and the second tapered surface to force each segment of the multiple segments inwardly toward the central axis. The multiple segments are configured to engage a cable to secure the cable within the ring shape.

19 Claims, 6 Drawing Sheets

(51) Int. Cl.
*H02G 15/007* (2006.01)
*H02G 3/06* (2006.01)
*H02G 15/04* (2006.01)

(56) References Cited

U.S. PATENT DOCUMENTS

| | | | |
|---|---|---|---|
| 3,989,340 A * | 11/1976 | Sheldon | H02G 3/065 |
| | | | 439/462 |
| 4,030,741 A | 6/1977 | Fidrych | |
| 4,208,085 A * | 6/1980 | Lawrence et al. | 439/462 |
| 4,219,204 A | 8/1980 | Pippert | |
| 4,323,727 A * | 4/1982 | Berg | 174/135 |
| 4,387,267 A * | 6/1983 | Becker | 174/655 |
| 4,525,000 A | 6/1985 | Bachle | |
| 5,051,541 A | 9/1991 | Bawa et al. | |
| 5,059,747 A | 10/1991 | Bawa et al. | |
| 5,087,795 A | 2/1992 | Guginsky | |
| 5,246,376 A * | 9/1993 | Schuhl et al. | 439/98 |
| 5,615,896 A | 4/1997 | Morvant | |
| 5,621,191 A * | 4/1997 | Norris et al. | 174/653 |
| 6,497,416 B1 | 12/2002 | Morvant | |
| RE38,294 E | 11/2003 | Nattel et al. | |
| 6,809,263 B2 | 10/2004 | Jackson | |
| 6,863,278 B2 | 3/2005 | Morvant | |
| 7,086,897 B2 | 8/2006 | Montena | |
| 7,188,691 B2 | 3/2007 | Yong et al. | |
| 7,300,309 B2 | 11/2007 | Montena | |
| 7,749,021 B2 | 7/2010 | Brodeur | |
| 7,781,685 B2 | 8/2010 | Bartholoma et al. | |
| 8,288,667 B2 | 10/2012 | Chiou | |
| 8,376,366 B2 | 2/2013 | Richards | |
| 8,440,919 B2 | 5/2013 | Robb et al. | |
| 2009/0025977 A1 * | 1/2009 | Anderson et al. | 174/653 |
| 2010/0003001 A1 | 1/2010 | Hand | |
| 2012/0142207 A1 | 6/2012 | Duval et al. | |
| 2012/0312593 A1 | 12/2012 | Aldrich et al. | |

FOREIGN PATENT DOCUMENTS

| | | |
|---|---|---|
| CA | 2655700 C | 11/2012 |
| DE | 20211347 | 10/2002 |
| EP | 1172596 A1 | 6/2001 |
| WO | 8602209 | 4/1986 |
| WO | 2009144505 A1 | 3/2009 |
| WO | 2010054021 A2 | 5/2010 |
| WO | 2010054026 A2 | 5/2010 |
| WO | 2011053438 A1 | 5/2011 |
| WO | 2011053439 A2 | 5/2011 |
| WO | 2011053440 A1 | 5/2011 |
| WO | 2012166351 A2 | 12/2012 |

OTHER PUBLICATIONS

"CMP—The Cable Gland and Connector Specialists." CMP Products. Mar. 18, 2014. http://www.cmp-products.com/tc.php.
"Cable Glands and Cable Accessories." Crouse-Hinds. Mar. 18, 2014. http://www.cooperindustries.com/content/public/en/crouse-hinds/products/industrial_fittingsglands/cable_glands_andcableaccessories.html.

* cited by examiner

CABLE RESTRAIN DEVICE WITH DUAL-MATERIAL DOUBLE WEDGE CHUCK

CROSS-REFERENCE TO RELATED APPLICATION

This application is a continuation-in-part application of and claims priority to U.S. patent application Ser. No. 14/151,994, filed Jan. 10, 2014, which is a non-provisional application claiming priority under 35 U.S.C. §119, based on U.S. Provisional Patent Application No. 61/755,669 filed Jan. 23, 2013, the disclosures of which are hereby incorporated by reference herein.

BACKGROUND OF THE INVENTION

Electrical cable fittings may be used to connect a flexible cable to an enclosure and to provide strain relief. In some instances, the electrical fitting may include a chuck that is compressed against the cable to form a mechanical grip around the cable.

DETAILED DESCRIPTION OF THE PREFERRED EMBODIMENTS

The following detailed description refers to the accompanying drawings. The same reference numbers in different drawings may identify the same or similar elements.

In systems and methods described herein, a cable fitting with a dual wedge chuck can provide increased cable retention force and reduced fitting length over single wedge fittings. According to one implementation, a chuck for a cable fitting includes multiple segments substantially forming a ring shape. Each segment of the multiple segments includes a first tapered surface, on a distal end, that slopes from the distal end away from a central axis of the ring, and a second tapered surface, on a proximal end, that slopes from the proximal end away from the central axis. The chuck for the cable fitting also includes a flexible band to hold the multiple segments in the ring shape. Each segment of the multiple segments is configured to receive compressive forces on the first tapered surface and the second tapered surface to force each segment inwardly toward the central axis so as to engage a cable within the ring shape.

Figure 1:
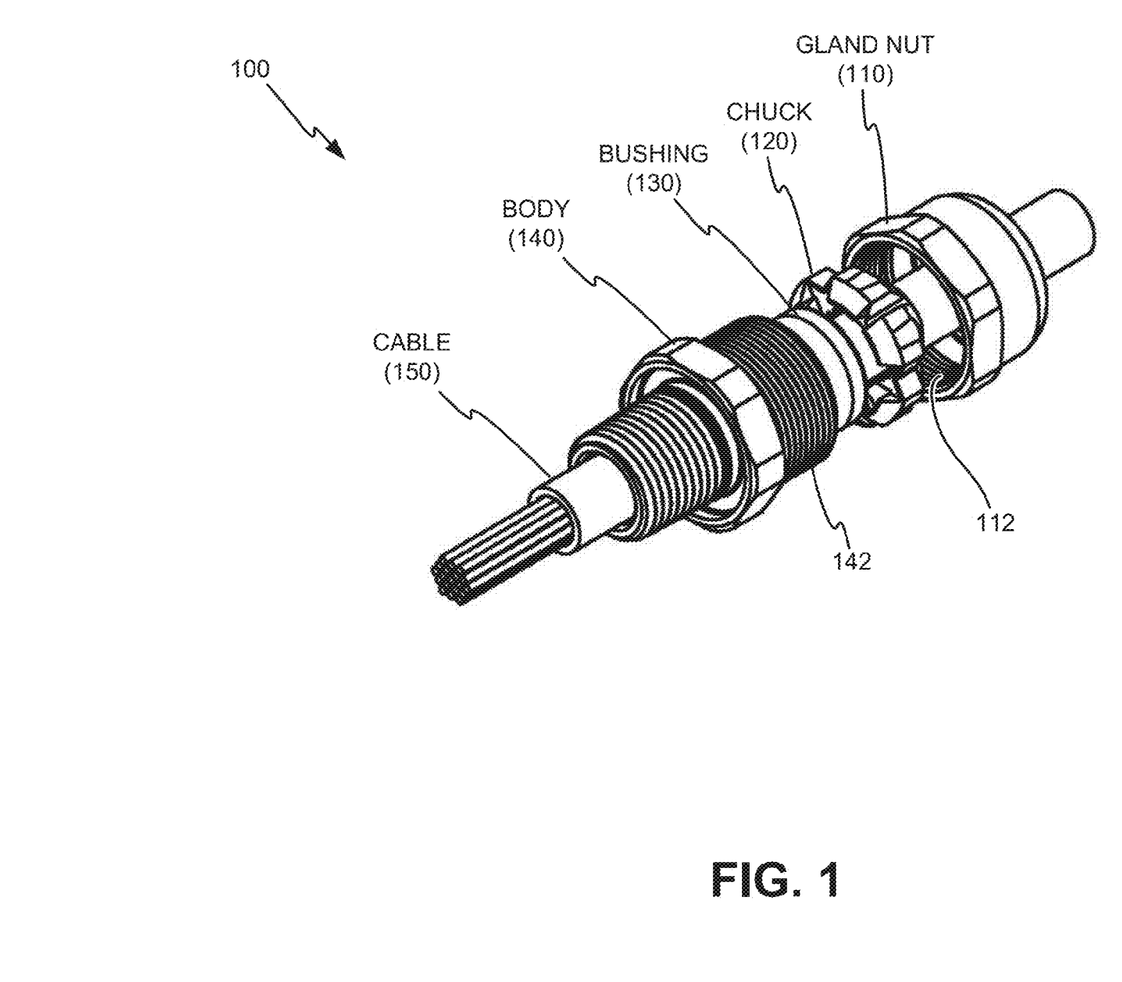
FIG. 1 is an isometric view of a cable restrain device in an unassembled configuration according to an implementation described herein.

FIG. 1 provides an isometric view of a cable restrain device 100 in an unassembled configuration according to an implementation described herein. As shown in FIG. 1, cable restrain device 100 may include a gland nut 110, a chuck 120, a bushing 130, and a body 140. In a use case, body 140 may be axially aligned over a cable 150 and joined together to secure cable 150 within cable restrain device 100. More particularly, threads 112 of gland nut 110 may engage threads 142 of body 140 to enclose chuck 120 and bushing 130. Tightening threads 112 and 142 cause gland nut 110 to overlap body 140. As gland nut 110 and body 140 move closer together along a central axis of cable restrain device 100, angled surfaces on the interior of gland nut 110 and body 140 cause chuck 120 to collapse inwardly against cable 150 to retain cable 150.

Gland nut 110 and body 140 may be formed from, for example, aluminum, steel, or non-metallic materials to provide a rigid structure for securing cable 150. Chuck 120 may include a softer material, such as nylon (e.g., 15% or 35% glass-filled nylon), that may allow chuck 120 to collapse inwardly and compress against cable 150. Bushing 130 may include a sealing material, such as a thermoplastic rubber or silicone, that may allow bushing 130 to be inwardly compressed and guided by chuck 120.

Figure 2:
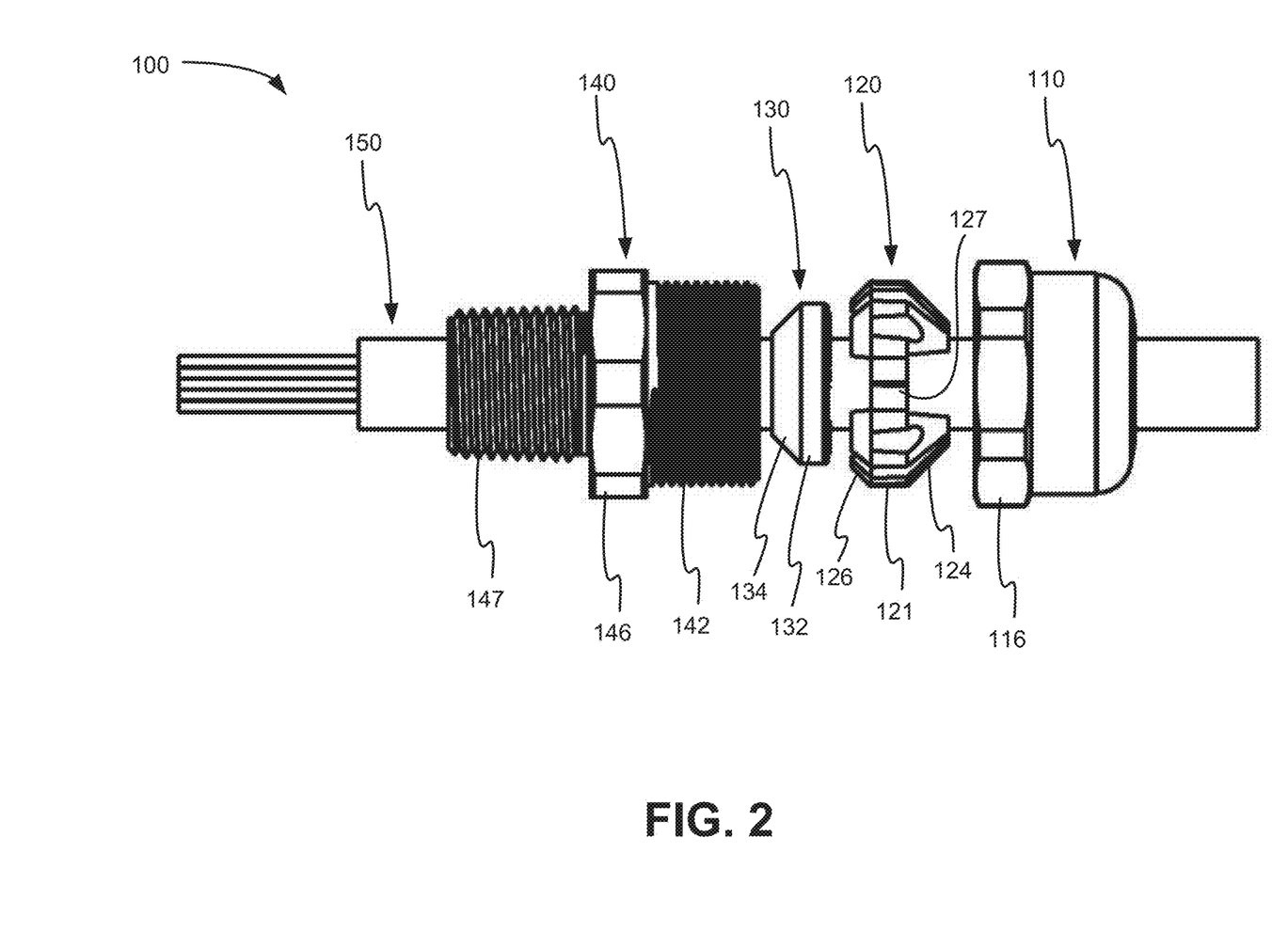
FIG. 2 is a side view of the cable restrain device of FIG. 1 in an unassembled configuration.
Figure 3:
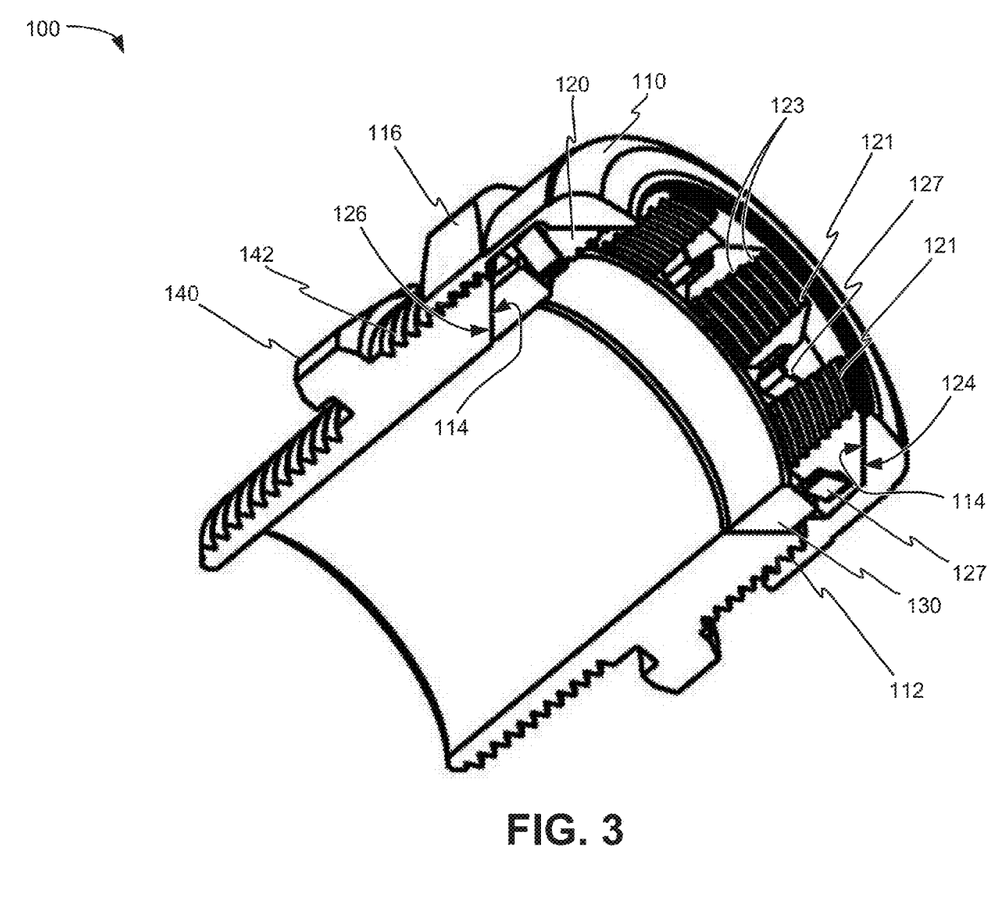
FIG. 3 is a cut-away perspective view of the cable restrain device of FIG. 1 in an assembled configuration.
Figure 4:
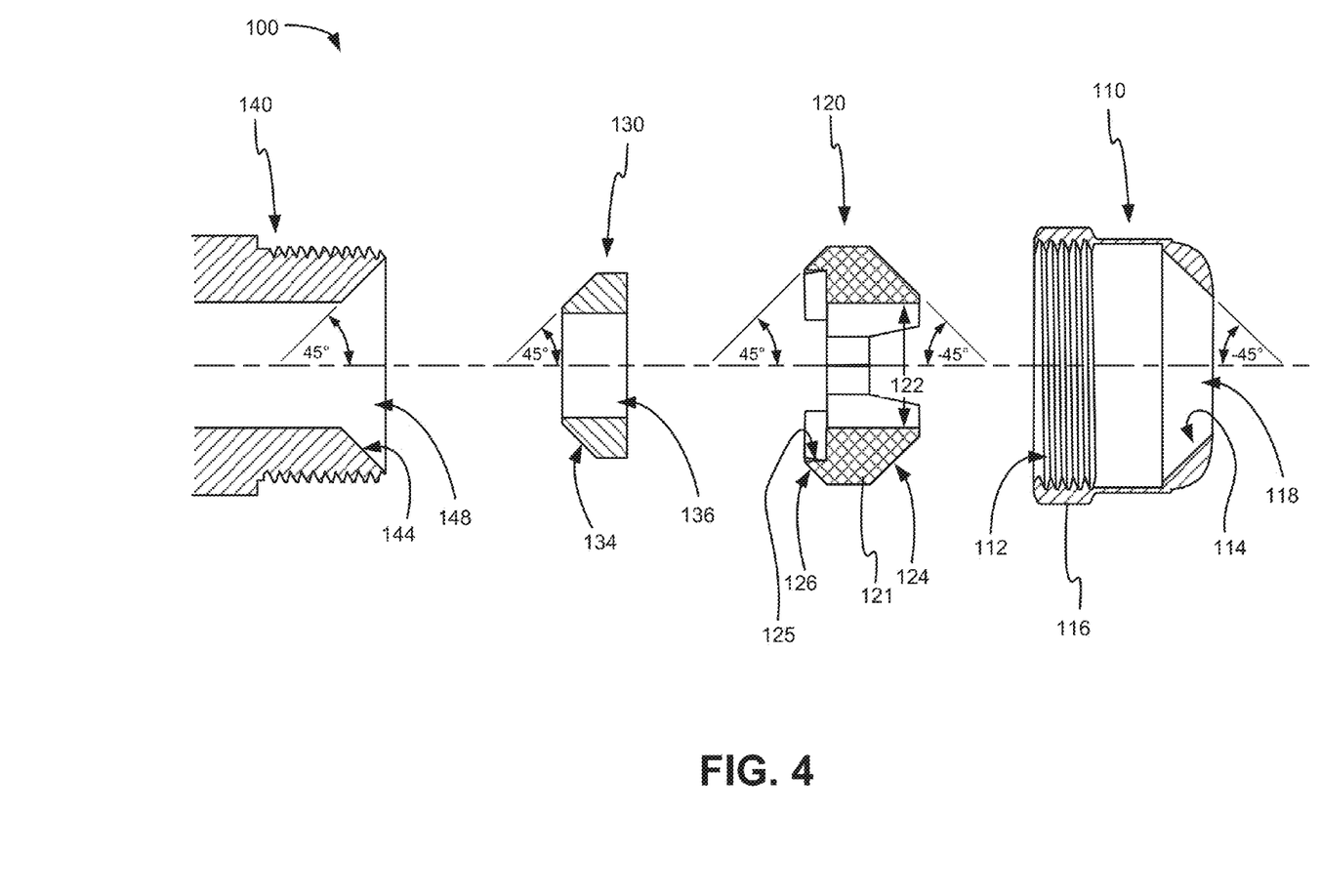
FIG. 4 is an exploded side cross-section view of the cable restrain device of FIG. 1.

FIG. 2 provides a side view of cable restrain device 100 in an unassembled configuration. FIG. 3 provides a cut-away perspective view of cable restrain device 100 in an assembled configuration. FIG. 4 provides an exploded side cross-section views of cable restrain device 100. Referring collectively to FIGS. 2-4, gland nut 110 may include interior threads 112, a sloped contact surface 114, a hexagonal band 116, and a bore 118.

Interior threads 112 may be configured to engage corresponding external threads 142 of body 140. Sloped contact surface 114 may extend annularly to form a portion of bore 118 of gland nut 110. Sloped contact surface 114 may generally have an angle from a central axis that provides a gradually decreasing inside diameter of a portion of bore 118 in a direction extending axially from a proximal end to a distal end of cable restrain device 100. For example, as shown in FIG. 4, sloped contact surface 114 may have an angle of −45 degrees that extends annularly about the central axis of cable restrain device 110. As described further herein, the angle of sloped contact surface 114 shown in FIG. 4 is illustrative, and other angles may be used (e.g., greater than or less than −45 degrees). The angle of sloped contact surface 114 may match a corresponding contact surface of chuck 120 (e.g., distal end tapered surface 124, described below) and may guide chuck 120 inwardly (e.g., toward a central axis of cable restrain device 100) as gland nut 110 is advanced axially onto body 140. Hexagonal band 116 may be provided on an outer surface of gland nut 110 to receive, for example, a wrench for tightening interior threads 112 of gland nut 110 onto threads 142 of body 140. Bore 118 may generally be configured to receive chuck 120 such that, when cable restrain device 100 is fully assembled, chuck 120 and bushing 130 may be contained within bore 118 of gland nut 110.

Figure 5A:
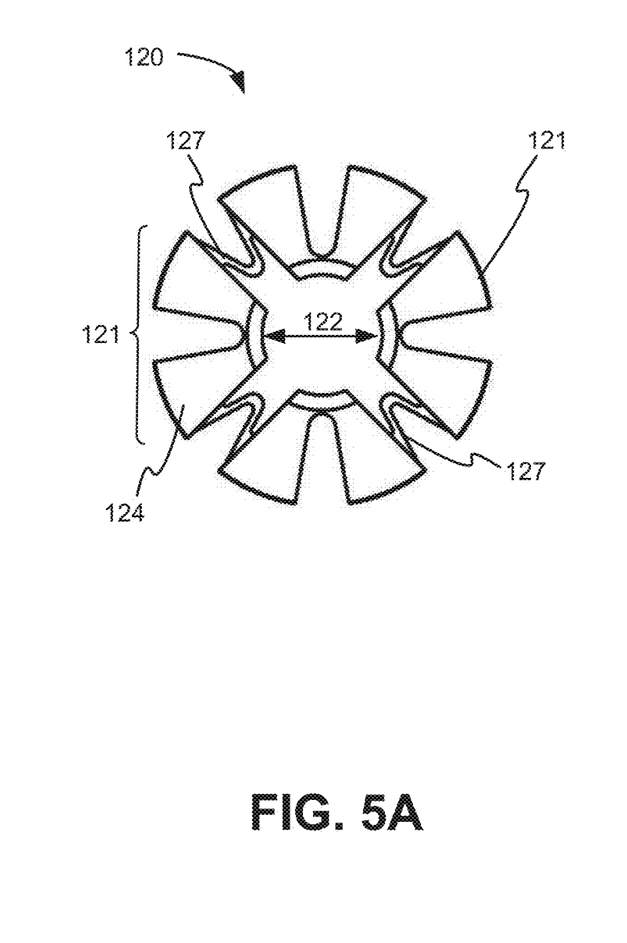
FIGS. 5A and 5B are a front view and side perspective view, respectively, of the chuck of the cable restrain device of FIG. 1.
Figure 5B:
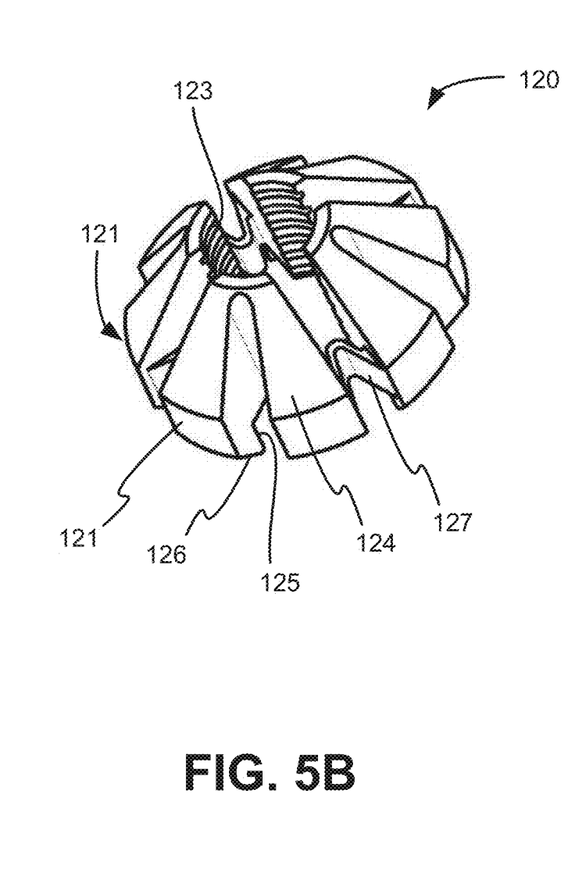

Additional views of chuck 120 are included in FIGS. 5A and 5B. Particularly, FIG. 5A provides a front view (e.g., looking onto the distal end) of chuck 120, and FIG. 5B provides a side perspective view of chuck 120. Referring collectively to FIGS. 2-5B, chuck 120 may include multiple segments 121 joined in a hinged fashion to form a ring with an inside diameter 122 sized to fit around cable 150 (not illustrated in FIG. 5A). Each segment 121 of chuck 120 may include interior teeth 123, a distal end tapered surface 124, a shoulder 125, and a proximal end tapered surface 126. Segments 121 may be connected via joints 127, such that chuck 120 may have a variable inside diameter 122.

As shown in FIG. 3, chuck 120 may be secured within gland nut 110 (e.g., within bore 118, FIG. 4). Distal end tapered surface 124 and proximal end tapered surface 126 of each segment 121 may be configured to interface with sloped contact surface 114 of gland 110 and a sloped contact surface 144 (described further below) of body 140.

Distal end tapered surface 124 and proximal end tapered surface 126 may generally have opposing angles that force segments 121 inwardly (e.g., toward a central axis of cable restrain device 100) as compressive axial pressure is applied to chuck 120. The angle of distal end tapered surface 124 may generally match an angle of corresponding sloped contact surface 114 of gland nut 110. The angle of proximal end tapered surface 126 may generally match an angle of corresponding sloped contact surface of body 140 described below.

Shoulder 125 of each segment 121 may form a seat for bushing 130. As described further below, bushing 130 may rest within a portion of chuck 120 in a circumference defined by shoulders 125. Shoulders 125 may position a central bore of bushing 130 in the axial pathway for cable 150.

Each distal end tapered surface 124 and each proximal end tapered surface 126 may slide each segment 121 toward a central axis of cable restrain device 100 as gland nut 110 is advanced on body 140. In one implementation, joints 127 may collapse inwardly (e.g., toward a central axis of cable restrain device 100) to permit inward movement of segments 121. In one implementation, joints 127 may include relatively thinner sections (e.g., compared to segments 121) with angled strips molded to fold inwardly. In another implementation, joints 127 may include scores lines or indentations essentially parallel to the axis of cable restrain device 100. Joints 127 may bend along the scored lines to allow segments 121 to collapse inwardly toward a central axis. Interior teeth 123 of each segment 121 may engage cable 150 to secure cable 150 within cable restrain device 100. Also, as joints 127 collapse inwardly, shoulder 125 of each segment 121 may force bushing 130 inward to seal around cable 150.

Referring to FIGS. 2-4, bushing 130 may include a generally ring-shaped object including a seating area 132 to engage chuck 120, a tapered surface 134 to engage body 140, and a central bore 136. The uncompressed diameter of bushing 130 at seating area 132 may generally be slightly smaller than an inside diameter of chuck 120 at shoulders 125 (e.g., before compression occurs). Tapered surface 134 may generally be configured to match the angle of proximal end tapered surface 126 and a sloped contact surface 144 of body 140 (described below). Tapered surface 134 may contact body 140 along sloped contact surface 144 when threads 112 of gland nut 110 are advanced onto threads 142 of body 140. Central bore 136 may generally be sized to accommodate cable 150 (or a particular range of sizes for cable 150). When inserted within chuck 120, central bore 136 may be axially aligned with a central axis of cable restrain device 100. Bushing 130 may be compressed (e.g., by shoulders 125 and sloped contact surface 144) to seal around cable 150 and sloped contact surface 144.

Body 140 may include external threads 142, sloped contact surface 144, a hexagonal band 146, installation threads 147, and a bore 148. External threads 142 may be configured to engage corresponding interior threads 112 of gland nut 110. Sloped contact surface 144 may extend annularly within body 140. Sloped contact surface 144 may generally have an angle from a central axis that provides a gradually increasing inside diameter of a portion of bore 148 in a direction extending axially from a proximal end to a distal end of cable restrain device 100. For example, as shown in FIG. 4, sloped contact surface 144 may have an angle of 45 degrees that extends annularly about the central axis of cable restrain device 110. As described further herein, the angle of sloped contact surface 144 shown in FIG. 4 is illustrative, and other angles may be used (e.g., greater than or less than 45 degrees). Sloped contact surface 144 may be wide enough to simultaneously contact surfaces on both chuck 120 and bushing 130 as chuck 120 and bushing 130 are compressed against body 140 by the threaded engagement of gland nut 110 with body 140.

The angle of sloped contact surface 144 may essentially match the angle of corresponding proximal end tapered surface 126 (of chuck 120) and tapered surface 134 (of bushing 130). Similar to sloped contact surface 114 of gland nut 110, sloped contact surface 144 of body 140 may guide chuck 120 inwardly as gland nut 110 is advanced axially onto body 140. Thus, chuck 120 may receive inwardly compressive forces on opposite ends from body 140 and gland nut 110, respectively.

Hexagonal band 146 may be provided on an outer surface of body 140 and may be configured to receive, for example, a wrench. Installation threads 147 of body 140 may be inserted through, for example, a wall of an enclosure or another support structure to which body 140 may be secured. In one implementation, a nut (not shown) may be applied over installation threads 147 with the wall in between to secure body 140 to the support structure. Bore 148 may generally be of a fixed diameter configured to receive cable 150 therethrough.

The taper angles of particular contact surfaces in cable restrain device 100 (e.g., sloped contact surface 114, distal end tapered surface 124, proximal end tapered surface 126, tapered surface 134, and sloped contact surface 144) may generally be shallower than conventional fittings that use a chuck and bushing compression system. The shallower taper angles may contribute to a reduction in the overall axial length of the cable restrain device 100. For example, as shown in FIG. 4, sloped contact surface 114 and distal end tapered surface 124 may have a one-to-one ratio of axial length to radial thickness (e.g., shown in FIG. 4 as an acute angle of −45 degrees). Similarly, proximal end tapered surface 126, tapered surface 134, and sloped contact surface 144 may have a one-to-one ratio of axial length to radial thickness (e.g., shown in FIG. 4 as an acute angle of 45 degrees).

In other implementations, different angles/ratios than those shown in FIG. 4 may be used. For example, any slope angles greater than ±25 degrees up to ±45 degrees or more may generally provide for a reduction in overall length, with predictable alignment, of cable restrain device 100 over conventional fittings. In another example, the proximal side angles (e.g., for proximal end tapered surface 126, tapered surface 134, and sloped contact surface 144) may be steeper or shallower than the distal side angles (e.g., for sloped contact surface 114, distal end tapered surface 124). Thus, in contrast with the illustration of FIG. 4, the angles of all sloped surfaces on the proximal side may not have the same absolute degree (e.g. ±value) as sloped surfaces on the distal side.

Figure 6A:
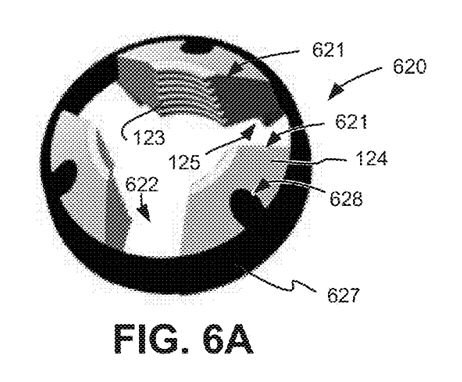
FIGS. 6A and 6B are a side perspective view and a side view, respectively, of a dual material chuck for the cable restrain device of FIG. 1, according to another implementation described herein.
Figure 6B:
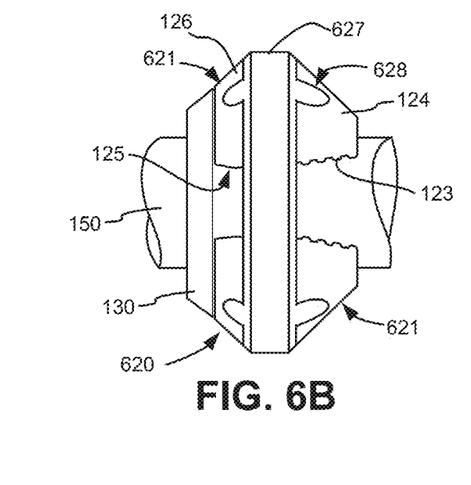

FIGS. 6A and 6B illustrate a chuck for cable restrain device 100 according to another implementation described herein. FIG. 6A provides a side perspective view of a chuck 620 with three discrete segments 621. FIG. 6B provides a side view of chuck 620 installed against bushing 130 and cable 150.

Referring collectively to FIGS. 6A and 6B, chuck 620 provides a multi-material embodiment that may be used in place of chuck 120 (e.g., FIG. 1) for cable restrain device 100. As shown in FIGS. 6A and 6B, chuck 620 may include multiple segments 621 joined by a flexible band 627 to form a ring with an inside diameter sized to fit around a cable (e.g., cable 150, as shown in FIG. 6B). In the configuration of FIG. 6A, chuck 620 may include three discrete segments 621 sized to accommodate a particular cable 150 diameter or a particular range of cable 150 diameters. Similar to segments 121 of chuck 120 described above, each segment 621 of chuck 620 may include interior teeth 123, a distal end tapered surface 124, a shoulder 125, and a proximal end tapered surface 126 (not visible in FIG. 6A).

In one implementation, segments 621 may be molded from a nylon-based material, such as 15% or 35% glass-filled nylon. In contrast with chuck 120, segments 621 of chuck 620 may be joined via flexible band 627. Flexible band 627 may be formed, for example, from a thermoplastic elastomer (TPE) and molded over multiple segments 621. In an exemplary implementation, each segment 621 may include a groove 628 into which a portion of flexible band 627 may be molded to join multiple segments 621 of chuck 620 as a unified piece. Elastic properties of flexible band 627 may provide a variable inside diameter for chuck 620. More particularly, segments 621 may be spaced slightly apart (e.g., with gaps 622 between segments 621) to allow band 627 to deform and collapse segments 621 (e.g., inwardly toward a central axis) onto bushing 130 and cable 150. Interior teeth 123 of each segment 621 may engage cable 150 to secure cable 150 within cable restraint device 100. Also, as segments 621 collapse inwardly, shoulder 125 of each segment 621 may force bushing 130 inwardly to seal around cable 150.

Figure 6C:
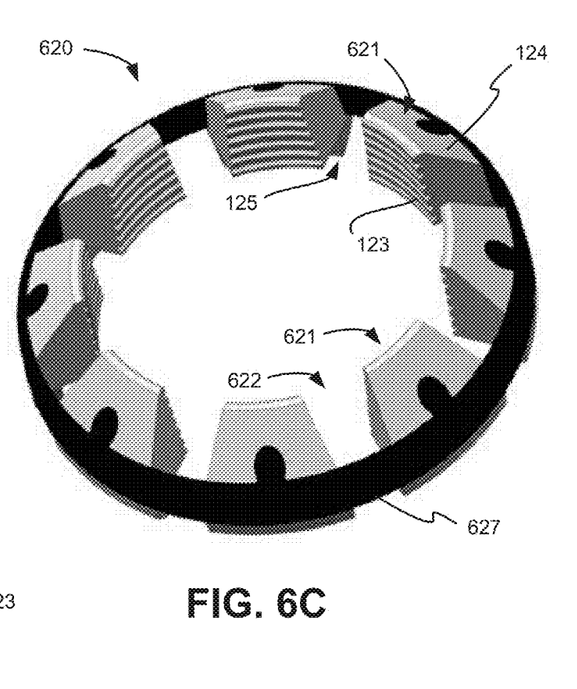
FIG. 6C is a side perspective view of another dual material chuck according to an implementation described herein.

FIG. 6C provides a side perspective view of another embodiment of chuck 620. In the embodiment of FIG. 6C, chuck 620 may be configured with multiple segments 621 joined via flexible band 627. However, the number of segments 621 in the embodiment of FIG. 6C may be increased to facilitate a larger inside diameter for chuck 620 (e.g., to accommodate a larger diameter cable 150). Generally, in the configuration of FIGS. 6A-6C, the dual materials of chuck 620 may provide improved strain performance at a wide range of temperatures (e.g., -60° C. to 110° C.), compared with, for example, use of single nylon material chuck (e.g., chuck 120) in cable restraint device 100.

According to embodiments described herein, cable restraint device 100 provides for protection against the environment (e.g., dust, moisture, etc.) and prevents pull-out of cable 150. In some implementations, cable restraint device 100 may be installed to meet International Electrotechnical Commission (IEC) standards for pull-out force and provide a weatherproof seal using a single device.

In contrast with the implementations described herein, conventional fittings that use a single wedge chuck may have relatively long gland nuts at the distal end that are expensive to manufacture and require a larger amount of metal to form. Also, the length of these conventional fittings can make them difficult to mount in tight spaces. limey simply decreasing the length of the fitting would result in a larger taper angle on its internal parts which can compromise the self-guiding property of the bushing-chuck stack. For example, if the taper angle exceeds 25 degrees and a length/thickness ratio is less than one, the alignment behavior of the bushing-chuck stack is generally unpredictable.

Thus, according to an implementation described herein, a cable fitting may include a gland nut, a body, and a chuck. The gland nut may include first threads, an axial gland bore, and a first sloped surface along a portion of the axial gland bore. The body may include second threads configured to receive the first threads, an axial body bore, and a second sloped surface along a portion of the axial body bore. The chuck may include multiple segments together in the shape of a ring. Each of the multiple segments may include a distal end tapered surface and a proximal end tapered surface. The gland nut, the body, and the chuck may be configured to form an axial pathway for receiving a cable. When the first threads of the gland nut are advanced onto the second threads of the body, the first sloped surface is configured to apply a first compressive force to the distal end tapered surfaces, and the second sloped surface is configured to apply a second compressive force to the proximal end tapered surfaces. The compressive forces cause inward deformation of the chuck to secure the cable within the axial pathway.

In another implementation, the cable fitting may further include a bushing with a central bore. Each of the multiple segments of the chuck may include a seating area to support the bushing within a circumference of the chuck and a shoulder to position the central bore in the axial pathway. When the first threads of the gland nut are advanced onto the second threads of the body, the shoulders may compress the bushing to seal around the cable.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above-mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A chuck for a cable fitting, comprising:
multiple segments, of a first material, substantially forming a ring shape, each segment of the multiple segments including:
a first tapered surface on a distal end, wherein the first tapered surface slopes from the distal end away from a central axis of the ring, and
a second tapered surface on a proximal end, wherein the second tapered surface slopes from the proximal end away from the central axis; and
an elastic band, of a second material that is different than the first material, to hold the multiple segments in the ring shape,
wherein each segment of the multiple segments is configured to receive compressive forces on the first tapered surface and the second tapered surface to force each segment of the multiple segments inwardly toward the central axis,
wherein each of the multiple segments includes a groove, oriented parallel to and facing away from the central axis, to receive a portion of the elastic band, and
wherein the multiple segments are configured to engage a cable to secure the cable within the ring shape.

2. The chuck of claim 1, wherein the elastic band is molded over each of the multiple segments to form a unified piece.

3. The chuck of claim 1, wherein the ring shape includes gaps between each of the multiple segments when the multiple segments are not receiving compressive forces.

4. The chuck of claim 1, wherein the second material comprises a thermoplastic elastomer (TPE).

5. The chuck of claim 1, wherein the first material includes a nylon-based material.

6. The chuck of claim 1, wherein each of the multiple segments include:
a seating area to support a bushing within a circumference of the chuck, and
a shoulder to position a central bore of the bushing within the ring shape.

7. The chuck of claim 1, wherein a taper angle of one of the distal end tapered surfaces is an acute angle of 25 to 45 degrees from the central axis.

8. The chuck of claim 1, wherein each of the multiple segments includes a plurality of teeth along an inward-facing surface to engage the cable.

9. A cable fitting, comprising:
a gland nut including first threads, an axial gland bore, and a first sloped surface along a portion of the axial gland bore;
a body including second threads configured to receive the first threads, an axial body bore, and a second sloped surface along a portion of the axial body bore; and
a chuck including:
multiple segments together in a shape of a ring, wherein each of the multiple segments includes a distal end tapered surface and a proximal end tapered surface, and
a flexible band to hold the multiple segments in the ring shape, wherein the flexible band comprises a thermoplastic elastomer (TPE) molded over each of the multiple segments, and wherein each of the multiple segments includes a groove, oriented parallel to and facing away from a central axis, into which a portion of the flexible band is molded;
wherein the gland nut, the body, and the chuck are configured to form an axial pathway for receiving a cable,
wherein, when the first threads of the gland nut are advanced onto the second threads of the body, the first sloped surface is configured to apply a first compressive force to the distal end tapered surfaces, and the second sloped surface is configured to apply a second compressive force to the proximal end tapered surfaces, and
wherein the first and second compressive forces cause inward deformation of the chuck to secure the cable within the axial pathway.

10. The cable fitting of claim 9, wherein each of the multiple segments of the chuck is formed from a nylon-based material.

11. The cable fitting of claim 10, wherein the flexible band includes elastic properties that allow for altering an inside diameter of the chuck.

12. The cable fitting of claim 9, wherein the multiple segments are formed from a different material than the flexible band.

13. The cable fitting of claim 12, wherein the chuck operates at temperatures between −60° C. to 110° C. segments.

14. The cable fitting of claim 12, wherein the flexible band and the multiple segments form a unified piece.

15. The cable fitting of claim 9, further comprising:
a bushing with a central bore,
wherein each of the multiple segments of the chuck include:
a seating area to support the bushing within a circumference of the chuck, and
a shoulder to position the central bore in the axial pathway, and
wherein, when the first threads of the gland nut are advanced onto the second threads of the body, the shoulders of the multiple segments compress the bushing around the cable.

16. The cable fitting of claim 15, wherein the bushing comprises a silicone material.

17. The cable fitting of claim 15, wherein the bushing further comprises a tapered bushing surface and wherein the second sloped surface is configured to contact the tapered bushing surface.

18. The cable fitting of claim 9, wherein each of the multiple segments comprises a nylon material with teeth along an inward-facing surface.

19. A chuck for a cable fitting, comprising:
multiple segments, of a nylon-based material, substantially forming a ring shape, each segment of the multiple segments including:
a first tapered surface on a distal end, wherein the first tapered surface slopes in a first direction and
a second tapered surface on a proximal end, wherein the second tapered surface slopes in a second direction; and
a flexible band to hold the multiple segments in the ring shape,
wherein the flexible band comprises a thermoplastic elastomer (TPE) molded over each of the multiple segments, and wherein each of the multiple segments includes a groove, oriented parallel to and facing away from a central axis, into which a portion of the flexible band is molded,
wherein each segment of the multiple segments is configured to receive compressive forces on both the first tapered surface and the second tapered surface to force each segment of the multiple segments inwardly toward the central axis,
and wherein the multiple segments are configured to engage a cable.

* * * * *